United States Patent
Yu (10) Patent No.: US 8,226,053 B2
(45) Date of Patent: Jul. 24, 2012

(54) MUSICAL INSTRUMENT STAND THAT IS OPERATED SMOOTHLY AND STABLY AND IS ADJUSTED QUICKLY

(76) Inventor: Tsung-Yao Yu, Daya Township, Taichung County (TW)

( * ) Notice: Subject to any disclaimer, the term of this patent is extended or adjusted under 35 U.S.C. 154(b) by 229 days.

(21) Appl. No.: 12/850,699

(22) Filed: Aug. 5, 2010

(65) Prior Publication Data
US 2012/0032037 A1 Feb. 9, 2012

(51) Int. Cl.
*A47F 5/00* (2006.01)
(52) U.S. Cl. .................. 248/122.1; 248/447; 248/176.3; 84/327; 84/453
(58) Field of Classification Search ................ 248/447, 248/458, 514, 121, 122.1, 125.9, 176.3; 84/421, 84/327, 453; 984/257
See application file for complete search history.

(56) References Cited

U.S. PATENT DOCUMENTS

| | | | | |
|---|---|---|---|---|
| 2,153,821 A * | 4/1939 | Walberg | | 248/121 |
| 2,299,683 A * | 10/1942 | Curtis | | 248/122.1 |
| 4,047,684 A * | 9/1977 | Kobayashi | | 248/122.1 |
| 4,747,569 A * | 5/1988 | Hoshino | | 248/291.1 |
| 4,958,793 A * | 9/1990 | Hess | | 248/125.9 |
| 5,836,561 A * | 11/1998 | Liao | | 248/291.1 |
| 5,936,176 A * | 8/1999 | Lombardi | | 84/421 |
| 6,093,878 A * | 7/2000 | Hoshino | | 84/421 |
| 6,268,556 B1 * | 7/2001 | Liao | | 84/421 |
| 6,390,424 B1 * | 5/2002 | Kidushim et al. | | 248/122.1 |
| 6,774,293 B2 * | 8/2004 | Hsieh | | 84/327 |
| 6,814,332 B2 * | 11/2004 | Eason | | 248/122.1 |
| 6,838,602 B2 * | 1/2005 | Chang | | 84/327 |
| 7,040,831 B2 * | 5/2006 | Rapaport | | 403/84 |
| 7,256,338 B2 * | 8/2007 | Hsieh | | 84/421 |
| 7,320,449 B2 * | 1/2008 | Hsieh | | 248/122.1 |
| 7,395,994 B1 * | 7/2008 | Sikra | | 248/229.1 |
| 7,560,633 B1 * | 7/2009 | Wang | | 84/421 |
| 7,663,040 B1 * | 2/2010 | Hsieh | | 84/421 |
| 2011/0006968 A1 * | 1/2011 | Morrow | | 343/882 |

* cited by examiner

*Primary Examiner* — Bradley Duckworth
(74) *Attorney, Agent, or Firm* — Alan Kamrath; Kamrath IP Lawfirm, PA (57) ABSTRACT

A musical instrument stand includes an upright rod, a support assembly, and a transverse rod. The support assembly includes a base unit mounted on the upright rod, a holding unit mounted on the base unit, a locking unit connected with the base unit and pressing the holding unit, and a damping member located between the base unit and the holding unit. Thus, the damping member provides a damping effect to the holding unit so that the holding unit is rotated relative to the base unit stably. In addition, the holding unit can be rotated relative to the base unit to adjust the angle of the transverse rod relative to the upright rod and can be moved in the holding unit to adjust the horizontal position of the transverse rod.

6 Claims, 6 Drawing Sheets

FIG. 1

PRIOR ART

MUSICAL INSTRUMENT STAND THAT IS OPERATED SMOOTHLY AND STABLY AND IS ADJUSTED QUICKLY

BACKGROUND OF THE INVENTION

1. Field of the Invention

The present invention relates to a support equipment and, more particularly, to a musical instrument stand for fixing a musical instrument, a microphone and the like.

2. Description of the Related Art

Figure 1:
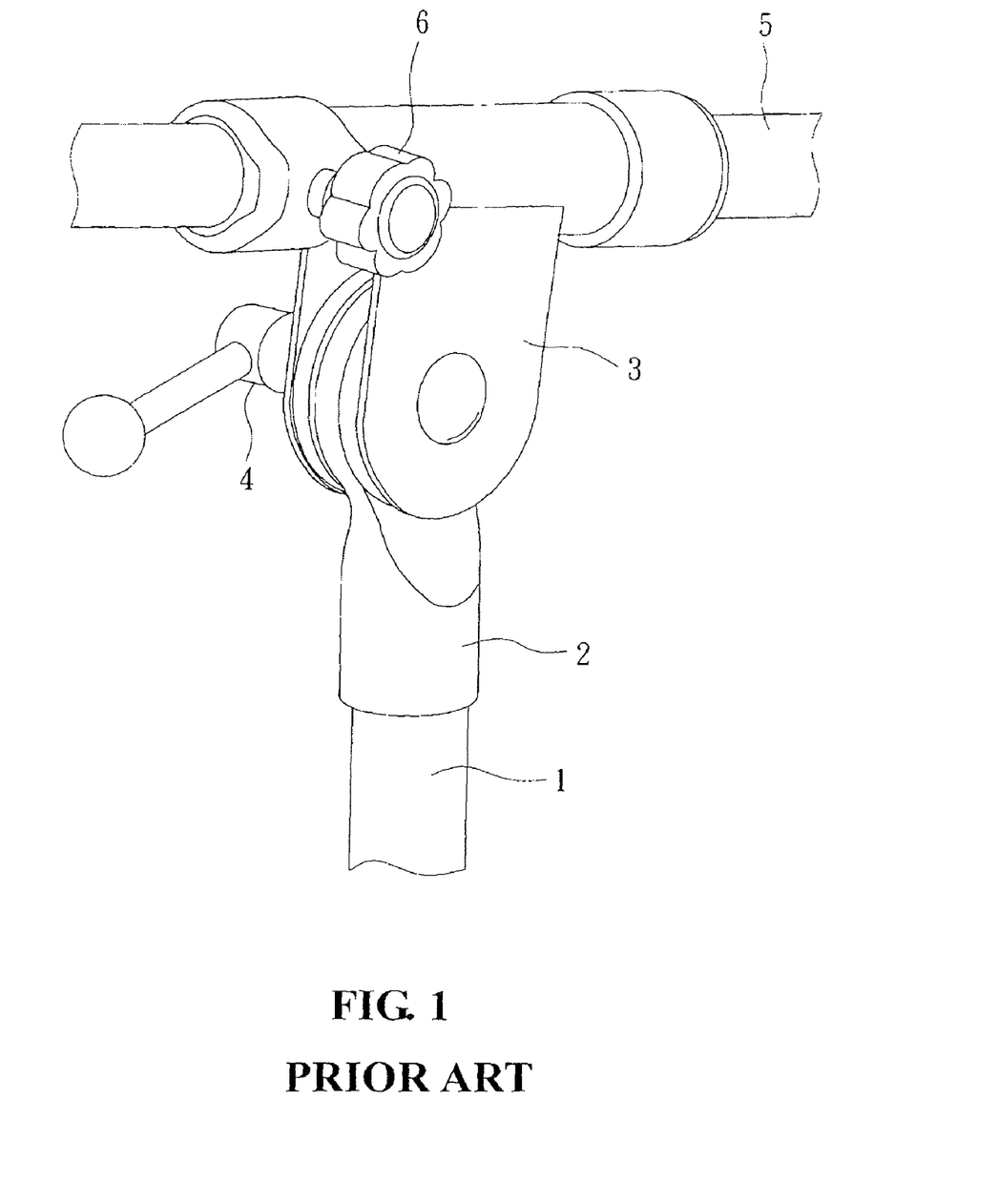
FIG. 1 is a perspective view of a conventional musical instrument stand in accordance with the prior art.
Figure 2:
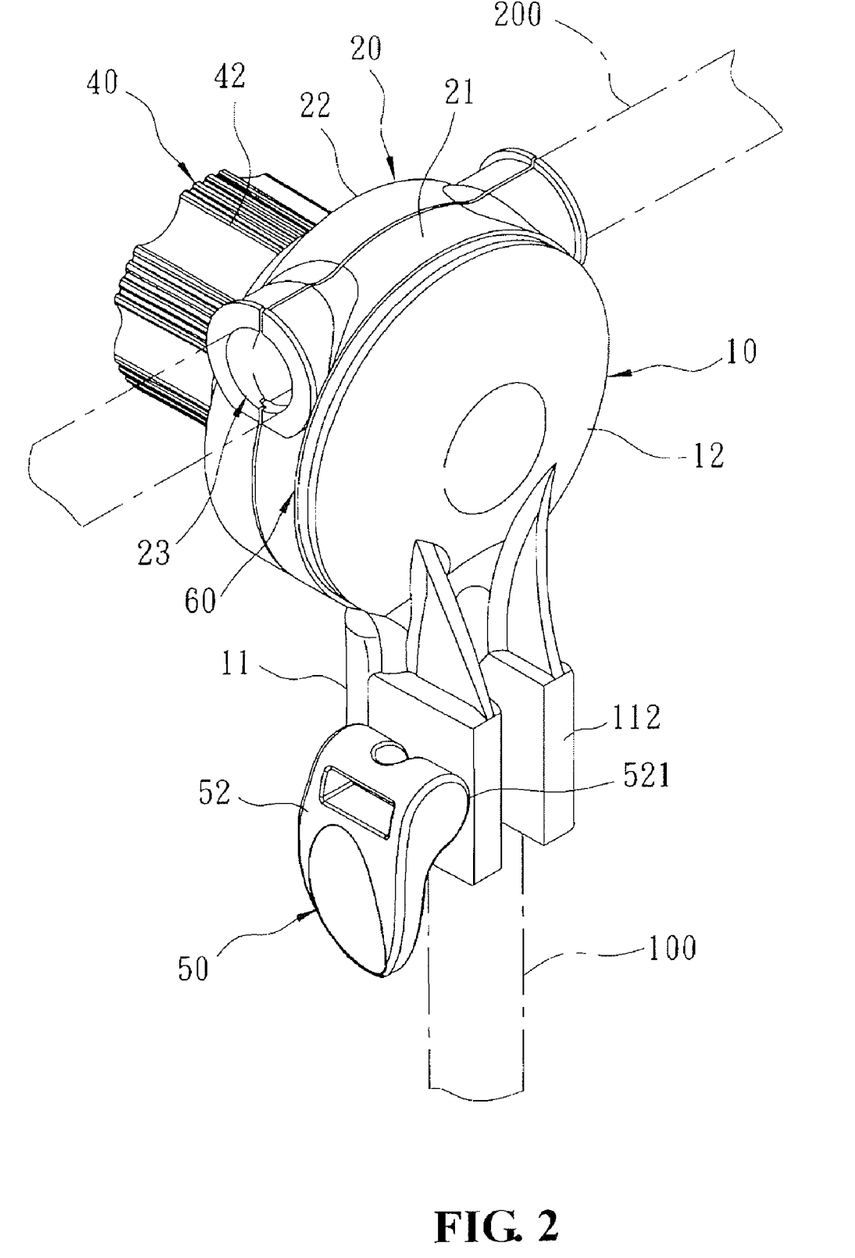
FIG. 2 is a perspective view of a musical instrument stand in accordance with the preferred embodiment of the present invention.
Figure 3:
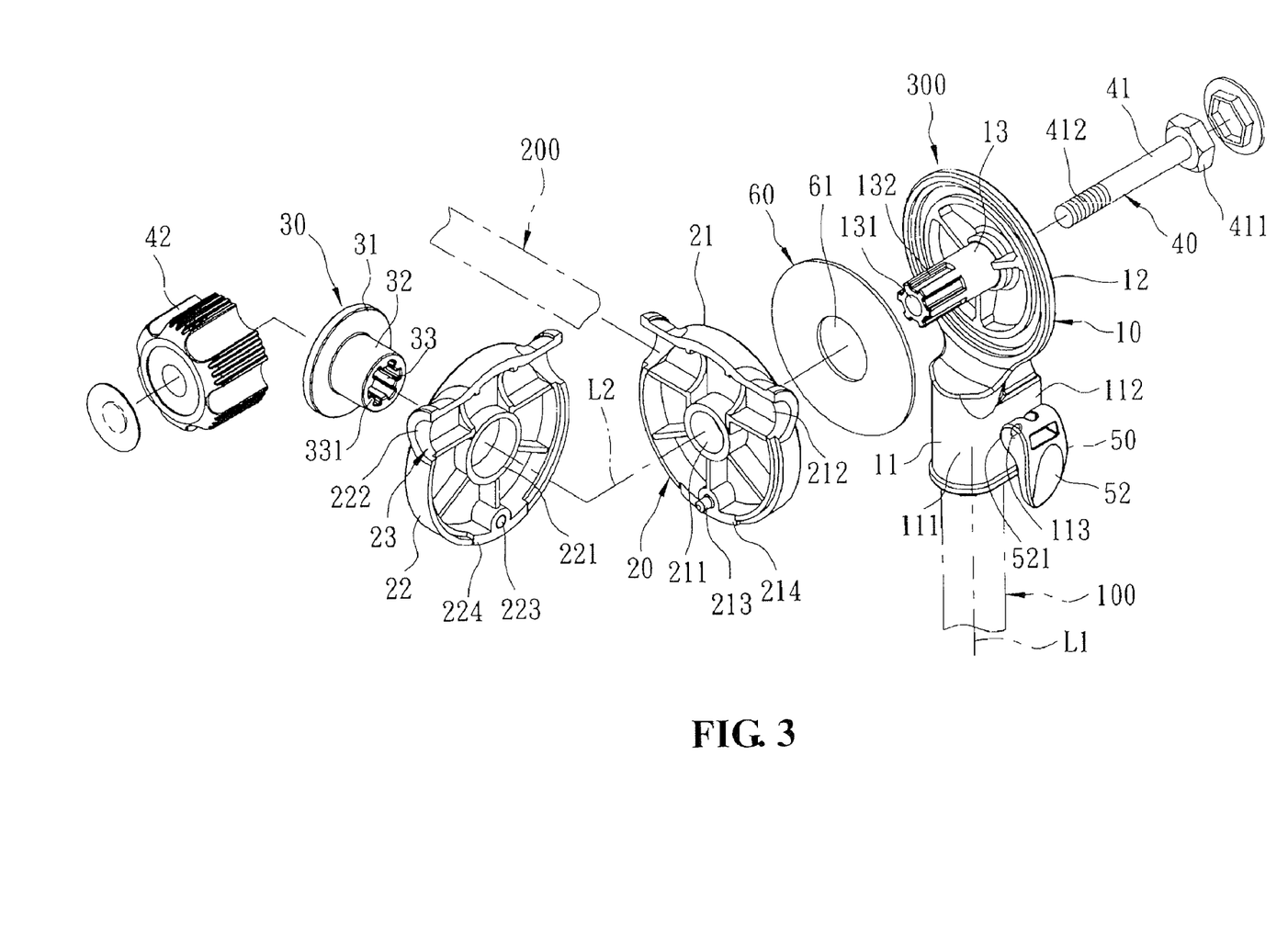
FIG. 3 is an exploded perspective view of the musical instrument stand as shown in FIG. 2.
Figure 4:
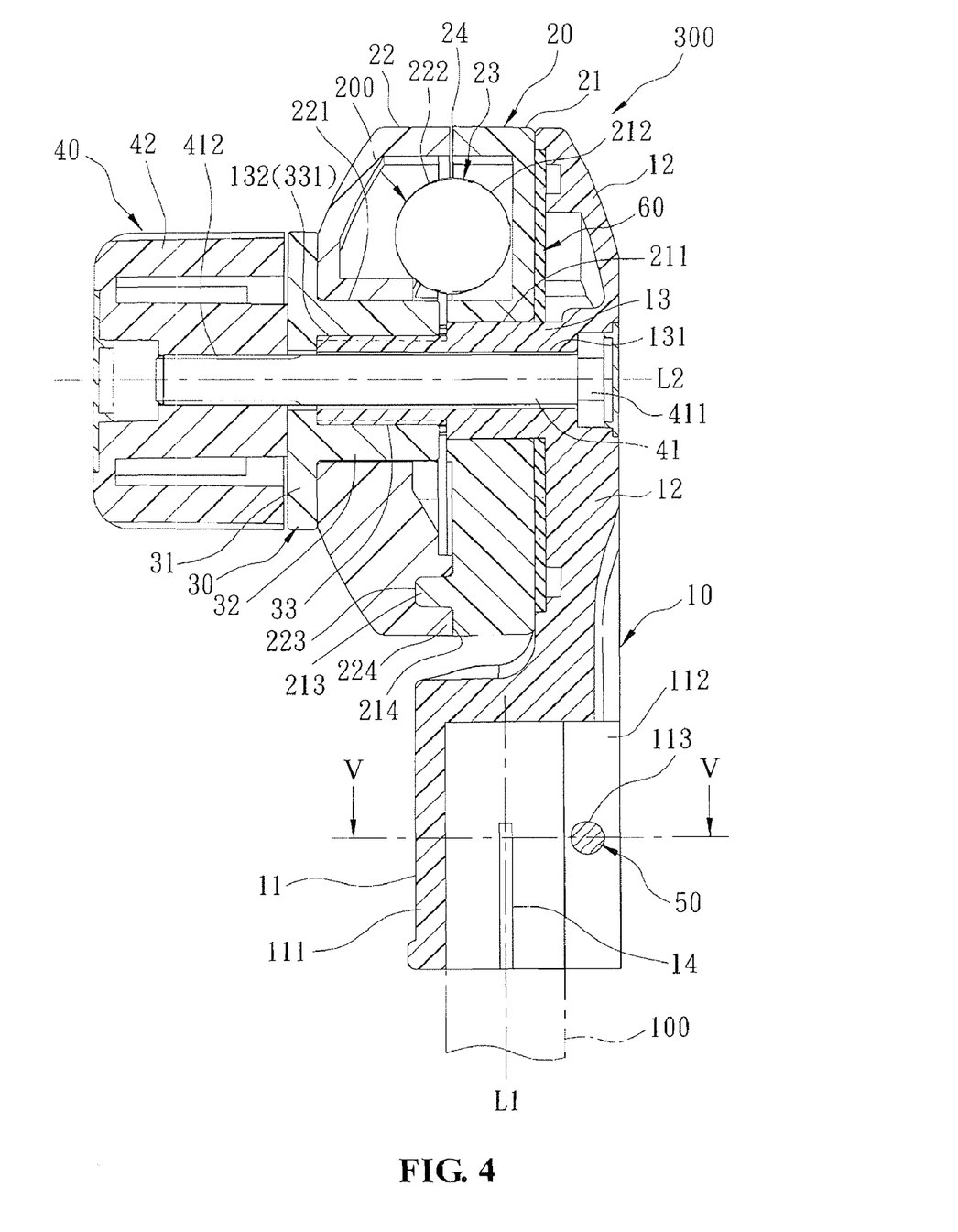
FIG. 4 is a side cross-sectional view of the musical instrument stand as shown in FIG. 2.
Figure 5:
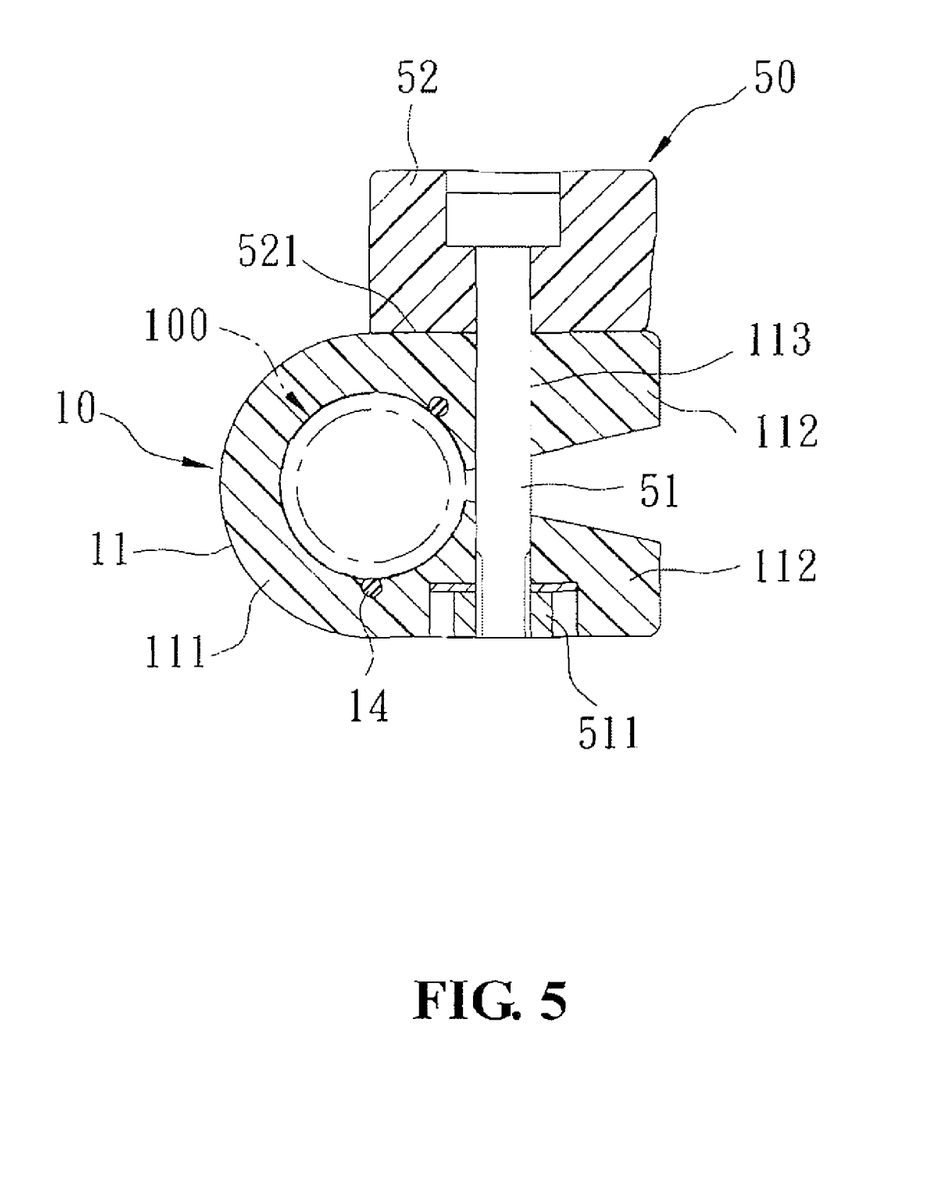
FIG. 5 is a cross-sectional view of the musical instrument stand taken along line V-V as shown in FIG. 4.

A conventional musical instrument stand in accordance with the prior art shown in FIG. 1 comprises an upright rod 1, a support seat 2 mounted on the top of the upright rod 1, a rotation seat 3 locked onto the support seat 2 by a quick release 4, and a transverse rod 5 locked onto the rotation seat 3 by a threaded locking knob 6. In operation, after the rotation seat 3 is unlocked from the support seat 2 by operation of the quick release 4, the rotation seat 3 can be rotated relative to the support seat 2 to adjust the angle of the transverse rod 5 relative to the upright rod 1. In addition, after the transverse rod 5 is unlocked from the rotation seat 3 by unscrewing the locking knob 6, the transverse rod 5 can be moved relative to the rotation seat 3 to adjust the position of the transverse rod 5 relative to the upright rod 1.

However, when the rotation seat 3 is unlocked from the support seat 2 by operation of the quick release 4, the rotation seat 3 can be rotated relative to the support seat 2 freely so that the user has to hold the transverse rod 5 by his one hand and to operate the quick release 4 by his other hand, thereby causing inconvenience to the user in adjustment of the angle of the transverse rod 5 relative to the upright rod 1. In addition, the user has to operate the quick release 4 for adjusting the angle of the transverse rod 5 relative to the upright rod 1 and has to operate the locking knob 6 for adjusting the position of the transverse rod 5 relative to the upright rod 1, thereby causing inconvenience to the user.

BRIEF SUMMARY OF THE INVENTION

In accordance with the present invention, there is provided a musical instrument stand, comprising an upright rod, a support assembly mounted on the upright rod, and a transverse rod mounted on the support assembly.

The support assembly includes a base unit mounted on the upright rod, a holding unit mounted on the base unit, a locking unit connected with the base unit and pressing the holding unit to lock the holding unit onto the base unit, and a damping member located between the base unit and the holding unit.

The base unit includes a positioning member secured on the upright rod, a support disk mounted on the positioning member, and a shaft mounted on and protruded from the support disk. The shaft of the base unit has an inner wall formed with a through hole. The holding unit is mounted on the shaft of the base unit and includes a first cover, a second cover combined with the first cover and a compressible space defined between the first cover and the second cover. The first cover of the holding unit has a central portion formed with a first shaft hole mounted on the shaft of the base unit and has a side formed with a first arcuate recess mounted on the transverse rod. The second cover of the holding unit has a central portion formed with a second shaft hole mounted on the shaft of the base unit and has a side formed with a second arcuate recess mounted on the transverse rod. The second arcuate recess of the second cover is juxtaposed to the first arcuate recess of the first cover to form a receiving hole to receive the transverse rod. The locking unit includes a fastening bolt extending through the through hole of the shaft, and a locking nut screwed onto the fastening bolt. The fastening bolt of the locking unit has a first end provided with an enlarged bolt head abutting the first cover of the holding unit and a second end provided with an outer thread protruding outward from the second shaft hole of the second cover. The locking nut of the locking unit is screwed onto the outer thread of the fastening bolt and presses the second cover of the holding unit so that the support disk of the base unit, the first cover of the holding unit and the second cover of the holding unit are located between the fastening bolt and the locking nut of the locking unit. The damping member is located between the support disk of the base unit and the first cover of the holding unit. The transverse rod extends through the receiving hole of the holding unit and is clamped between the first cover and the second cover of the holding unit.

The primary objective of the present invention is to provide a musical instrument stand that is operated smoothly and stably and is adjusted quickly.

According to the primary advantage of the present invention, when the holding unit is rotated about the shaft of the base unit to adjust the angle of the transverse rod relative to the upright rod, the damping member provides a damping effect to the holding unit to prevent the holding unit from being vibrated largely relative to the support disk of the base unit so that the holding unit is rotated relative to the base unit smoothly and stably to facilitate a user adjusting the angle of the transverse rod relative to the upright rod.

According to another advantage of the present invention, the holding unit can be rotated relative to the support disk of the base unit to adjust the angle of the transverse rod relative to the upright rod and can be moved in the receiving hole of the holding unit to adjust the horizontal position of the transverse rod.

According to a further advantage of the present invention, when the locking nut of the locking unit is tightened, the splines of the pressing member engage the keyways of the shaft respectively so that the holding unit is clamped between the push disk of the pressing member and the support disk of the base unit solidly and stably.

According to a further advantage of the present invention, the user only needs to operate the drive handle of the quick release so as to lock the positioning member of the base unit onto the upright rod or to unlock the positioning member of the base unit from the upright rod, thereby facilitating the user adjusting the position of the base unit relative to the upright rod.

According to a further advantage of the present invention, the retaining flange of the second cover is retained in the retaining groove of the first cover, and the plug of the first cover is locked in the socket of the second cover so that the first cover is combined with the second cover solidly and stably.

According to a further advantage of the present invention, the first arcuate recess of the first cover and the second arcuate recess of the second cover produce an elastic holding force by the compressible space defined between the first cover and the second cover so as to hold the transverse rod exactly.

Further benefits and advantages of the present invention will become apparent after a careful reading of the detailed description with appropriate reference to the accompanying drawings.

DETAILED DESCRIPTION OF THE INVENTION

Referring to the drawings and initially to FIGS. 2-5, a musical instrument stand in accordance with the preferred embodiment of the present invention comprises an upright rod 100, a support assembly 300 mounted on the upright rod 100, and a transverse rod 200 mounted on the support assembly 300.

The support assembly 300 includes a base unit 10 mounted on the upright rod 100, a holding unit 20 mounted on the base unit 10, a locking unit 40 connected with the base unit 10 and pressing the holding unit 20 to lock the holding unit 20 onto the base unit 10, and a damping member 60 located between the base unit 10 and the holding unit 20 to provide a damping effect to the base unit 10 and the holding unit 20.

The base unit 10 includes a positioning member 11 secured on the upright rod 100, a support disk 12 mounted on the positioning member 11, and a shaft 13 mounted on and protruded from the support disk 12. The positioning member 11 of the base unit 10 extends in a first axis "L1" which functions as a longitudinal axis of the upright rod 100. The shaft 13 of the base unit 10 extends in a second axis "L2" which is perpendicular to the first axis "L1". The shaft 13 of the base unit 10 has an inner wall formed with a through hole 131. The through hole 131 of the shaft 13 extends in the second axis "L2".

The holding unit 20 is mounted on the shaft 13 of the base unit 10 and includes a first cover 21, a second cover 22 combined with the first cover 21 and a compressible space 24 defined between the first cover 21 and the second cover 22. The first cover 21 of the holding unit 20 has a central portion formed with a first shaft hole 211 mounted on the shaft 13 of the base unit 10 and has a side formed with a first arcuate recess 212 mounted on the transverse rod 200. The second cover 22 of the holding unit 20 has a central portion formed with a second shaft hole 221 mounted on the shaft 13 of the base unit 10 and has a side formed with a second arcuate recess 222 mounted on the transverse rod 200. The second arcuate recess 222 of the second cover 22 is juxtaposed to the first arcuate recess 212 of the first cover 21 to form a receiving hole 23 to receive the transverse rod 200.

The locking unit 40 can lock the holding unit 20 onto the support disk 12 of the base unit 10. The locking unit 40 includes a fastening bolt 40 extending through the through hole 131 of the shaft 13, and a locking nut 42 screwed onto the fastening bolt 40. The fastening bolt 40 of the locking unit 40 has a first end provided with an enlarged bolt head 411 abutting the first cover 21 of the holding unit 20 and a second end provided with an outer thread 412 protruding outward from the second shaft hole 221 of the second cover 22. The locking nut 42 of the locking unit 40 is screwed onto the outer thread 412 of the fastening bolt 40 and presses the second cover 22 of the holding unit 20 so that the support disk 12 of the base unit 10, the first cover 21 of the holding unit 20 and the second cover 22 of the holding unit 20 are located between the fastening bolt 40 and the locking nut 42 of the locking unit 40.

The damping member 60 is located between the support disk 12 of the base unit 10 and the first cover 21 of the holding unit 20. The damping member 60 has an annular shape and has a central portion formed with a circular mounting bore 61 mounted on the shaft 13 of the base unit 10.

The transverse rod 200 extends through the receiving hole 23 of the holding unit 20 and is clamped between the first cover 21 and the second cover 22 of the holding unit 20.

In the preferred embodiment of the present invention, the second cover 22 of the holding unit 20 has a surface provided with a socket 223, and the first cover 21 of the holding unit 20 has a surface provided with a plug 213 inserted into and locked in the socket 223 of the second cover 22.

In the preferred embodiment of the present invention, the first cover 21 of the holding unit 20 has a periphery formed with a retaining groove 214, and the second cover 22 of the holding unit 20 has a periphery provided with a retaining flange 224 retained in the retaining groove 214 of the first cover 21.

In the preferred embodiment of the present invention, the positioning member 11 of the base unit 10 has a substantially C-shaped clamping wall 111 surrounding the upright rod 100 and two locking pieces 112 extending from two opposite ends of the clamping wall 111 respectively. Each of the two locking pieces 112 of the positioning member 11 has a surface formed with a locking hole 113. The support assembly 300 further includes a quick release 50 mounted on the positioning member 11 of the base unit 10 to clamp or release the positioning member 11 of the base unit 10 so as to tighten or loosen the upright rod 100. The quick release 50 includes a pull bar 51 extending through the locking hole 113 of each of the two locking pieces 112, a fastening member 511 mounted on a first end of the pull bar 51 and abutting a first one of the two locking pieces 112, and a drive handle 52 pivotally connected with a second end of the pull bar 51 and having a side provided with an eccentric cam face 521 abutting a second one of the two locking pieces 112. Thus, when the drive handle 52 of the quick release 50 is pivoted relative the positioning member 11 of the base unit 10, the cam face 521 of the drive handle 52 is moved to tighten or loosen the two locking pieces 112 so as to lock the positioning member 11 of the base unit 10 onto the upright rod 100 or to unlock the positioning member 11 of the base unit 10 from the upright rod 100.

In the preferred embodiment of the present invention, the base unit 10 further includes at least one antiskid bar 14 mounted in the clamping wall 111 of the positioning member 11 and abutting the upright rod 100 to prevent the positioning member 11 of the base unit 10 from slipping relative to the upright rod 100.

In the preferred embodiment of the present invention, the shaft 13 of the base unit 10 has an outer wall formed with a plurality of elongate keyways 132. The support assembly 300 further includes a pressing member 30 mounted between the holding unit 20 and the locking unit 40 so that the holding unit 20 is located between the pressing member 30 and the support disk 12 of the base unit 10. The pressing member 30 has a first side formed with a push disk 31 located between the second cover 22 of the holding unit 20 and the locking nut 42 of the locking unit 40 and a second side formed with a mounting sleeve 32 located between the second shaft hole 221 of the second cover 22 and the shaft 13 of the base unit 10. The mounting sleeve 32 of the pressing member 30 is inserted into the second shaft hole 221 of the second cover 22. The mounting sleeve 32 of the pressing member 30 has an inner wall formed with a mounting hole 33 mounted on the shaft 13 of the base unit 10, and the shaft 13 of the base unit 10 is inserted into the mounting hole 33 of the mounting sleeve 32. The mounting hole 33 of the mounting sleeve 32 has a periphery provided with a plurality of elongate splines 331 inserted into and locked in the keyways 132 of the shaft 13 respectively. Thus, the locking nut 42 of the locking unit 40 presses the push disk 31 of the pressing member 30 toward the holding unit 20 so that the holding unit 20 is clamped between the push disk 31 of the pressing member 30 and the support disk 12 of the base unit 10. In such a manner, the first arcuate recess 212 of the first cover 21 and the second arcuate recess 222 of the second cover 22 produce an elastic holding force by the compressible space 24 defined between the first cover 21 and the second cover 22 so as to hold the transverse rod 200 exactly.

In operation, referring to FIGS. 2-6, when the drive handle 52 of the quick release 50 is pivoted relative the positioning member 11 of the base unit 10, the cam face 521 of the drive handle 52 is moved to tighten or loosen the two locking pieces 112 so as to lock the positioning member 11 of the base unit 10 onto the upright rod 100 or to unlock the positioning member 11 of the base unit 10 from the upright rod 100. At this time, the antiskid bar 14 is secured in the clamping wall 111 of the positioning member 11 and presses the upright rod 100 to prevent the positioning member 11 of the base unit 10 from slipping relative to the upright rod 100.

Figure 6:
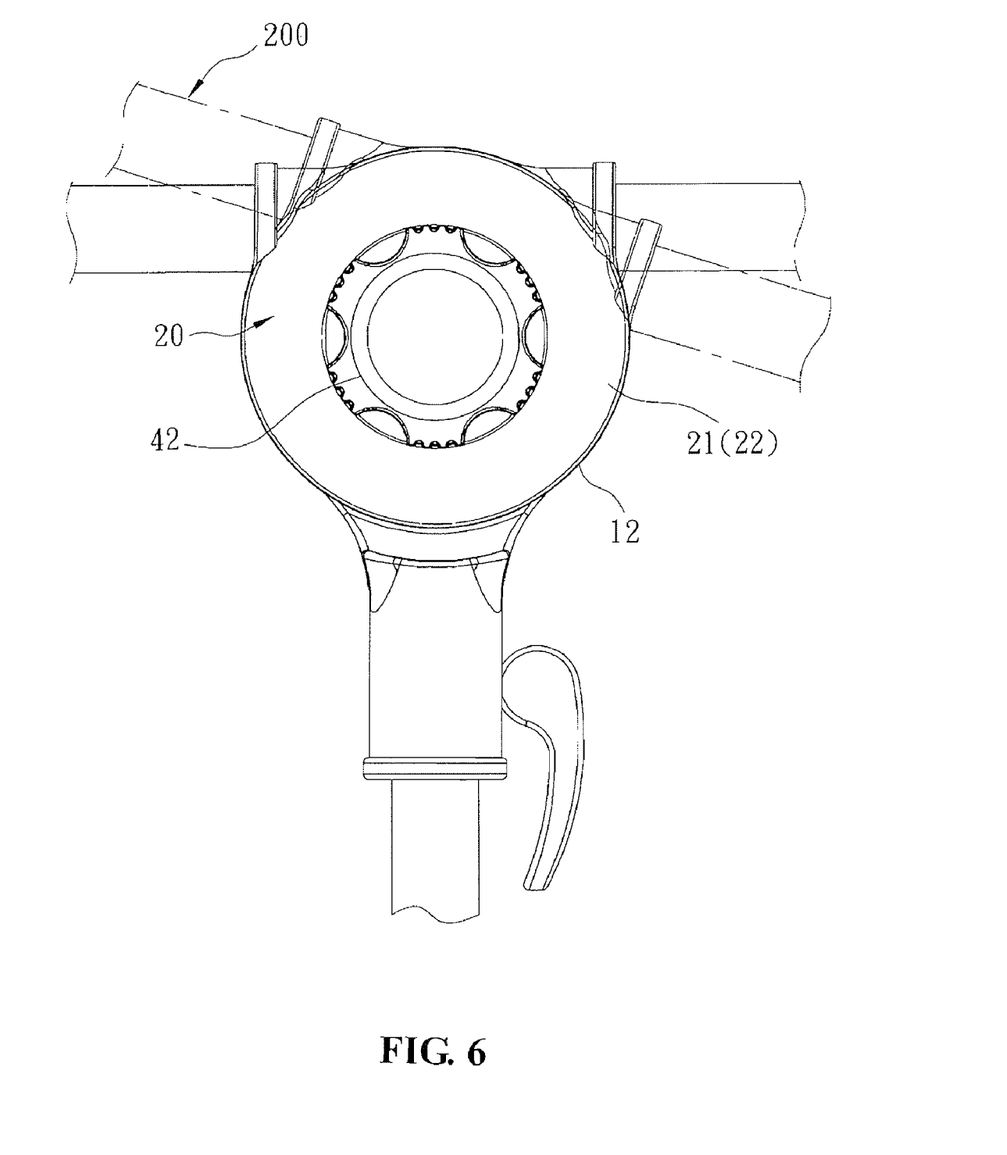
FIG. 6 is a schematic side operational view of the musical instrument stand as shown in FIG. 2.

On the other hand, when the locking nut 42 of the locking unit 40 is unscrewed from the outer thread 412 of the fastening bolt 40, the holding unit 20 is unlocked from the locking unit 40 and the base unit 10 so that the holding unit 20 can be rotated about the shaft 13 of the base unit 10 to adjust the angle of the transverse rod 200 relative to the upright rod 100 as shown in FIG. 6. In addition, the transverse rod 200 is unlocked from the first arcuate recess 212 of the first cover 21 and the second arcuate recess 222 of the second cover 22 so that the transverse rod 200 is moved in the receiving hole 23 of the holding unit 20 to adjust the horizontal position of the transverse rod 200.

Accordingly, when the holding unit 20 is rotated about the shaft 13 of the base unit 10 to adjust the angle of the transverse rod 200 relative to the upright rod 100, the damping member 60 provides a damping effect to the holding unit 20 to prevent the holding unit 20 from being vibrated largely relative to the support disk 12 of the base unit 10 so that the holding unit 20 is rotated relative to the base unit 10 smoothly and stably to facilitate a user adjusting the angle of the transverse rod 200 relative to the upright rod 100. In addition, the holding unit 20 can be rotated relative to the support disk 12 of the base unit 10 to adjust the angle of the transverse rod 200 relative to the upright rod 100 and can be moved in the receiving hole 23 of the holding unit 20 to adjust the horizontal position of the transverse rod 200. Further, when the locking nut 42 of the locking unit 40 is tightened, the splines 331 of the pressing member 30 engage the keyways 132 of the shaft 13 respectively so that the holding unit 20 is clamped between the push disk 31 of the pressing member 30 and the support disk 12 of the base unit 10 solidly and stably. Further, the user only needs to operate the drive handle 52 of the quick release 50 so as to lock the positioning member 11 of the base unit 10 onto the upright rod 100 or to unlock the positioning member 11 of the base unit 10 from the upright rod 100, thereby facilitating the user adjusting the position of the base unit 10 relative to the upright rod 100. Further, the retaining flange 224 of the second cover 22 is retained in the retaining groove 214 of the first cover 21, and the plug 213 of the first cover 21 is locked in the socket 223 of the second cover 22 so that the first cover 21 is combined with the second cover 22 solidly and stably. Further, the first arcuate recess 212 of the first cover 21 and the second arcuate recess 222 of the second cover 22 produce an elastic holding force by the compressible space 24 defined between the first cover 21 and the second cover 22 so as to hold the transverse rod 200 exactly.

Although the invention has been explained in relation to its preferred embodiment(s) as mentioned above, it is to be understood that many other possible modifications and variations can be made without departing from the scope of the present invention. It is, therefore, contemplated that the appended claim or claims will cover such modifications and variations that fall within the true scope of the invention.

The invention claimed is:

1. A musical instrument stand, comprising:
an upright rod;
a support assembly mounted on the upright rod; and
a transverse rod mounted on the support assembly;
wherein the support assembly includes:
a base unit mounted on the upright rod;
a holding unit mounted on the base unit;
a locking unit connected with the base unit and pressing the holding unit to lock the holding unit onto the base unit; and
a damping member located between the base unit and the holding unit;
the base unit includes:
a positioning member secured on the upright rod;
a support disk mounted on the positioning member; and
a shaft mounted on and protruded from the support disk;
the shaft of the base unit has an inner wall formed with a through hole;
the holding unit is mounted on the shaft of the base unit and includes:
a first cover;
a second cover combined with the first cover; and
a compressible space defined between the first cover and the second cover;
the first cover of the holding unit has a central portion formed with a first shaft hole mounted on the shaft of the base unit and has a side formed with a first arcuate recess mounted on the transverse rod;
the second cover of the holding unit has a central portion formed with a second shaft hole mounted on the shaft of the base unit and has a side formed with a second arcuate recess mounted on the transverse rod;
the second arcuate recess of the second cover is juxtaposed to the first arcuate recess of the first cover to form a receiving hole to receive the transverse rod;
the locking unit includes:
a fastening bolt extending through the through hole of the shaft; and
a locking nut screwed onto the fastening bolt;
the fastening bolt of the locking unit has a first end provided with an enlarged bolt head abutting the first cover of the holding unit and a second end provided with an outer thread protruding outward from the second shaft hole of the second cover;
the locking nut of the locking unit is screwed onto the outer thread of the fastening bolt and presses the second cover of the holding unit so that the support disk of the base unit, the first cover of the holding unit and the second cover of the holding unit are located between the fastening bolt and the locking nut of the locking unit;
the damping member is located between the support disk of the base unit and the first cover of the holding unit;

the transverse rod extends through the receiving hole of the holding unit and is clamped between the first cover and the second cover of the holding unit.

2. The musical instrument stand of claim 1, wherein the second cover of the holding unit has a surface provided with a socket; and the first cover of the holding unit has a surface provided with a plug inserted into and locked in the socket of the second cover.

3. The musical instrument stand of claim 1, wherein the first cover of the holding unit has a periphery formed with a retaining groove; and the second cover of the holding unit has a periphery provided with a retaining flange retained in the retaining groove of the first cover.

4. The musical instrument stand of claim 1, wherein the positioning member of the base unit has a substantially C-shaped clamping wall surrounding the upright rod and two locking pieces extending from two opposite ends of the clamping wall respectively;

each of the two locking pieces of the positioning member has a surface formed with a locking hole;

the support assembly further includes a quick release mounted on the positioning member of the base unit to clamp or release the positioning member of the base unit so as to tighten or loosen the upright rod;

the quick release includes:

a pull bar extending through the locking hole of each of the two locking pieces;

a fastening member mounted on a first end of the pull bar and abutting a first one of the two locking pieces; and a drive handle pivotally connected with a second end of the pull bar and having a side provided with an eccentric cam face abutting a second one of the two locking pieces.

5. The musical instrument stand of claim 1, wherein the positioning member of the base unit extends in a first axis which functions as a longitudinal axis of the upright rod; the shaft of the base unit extends in a second axis which is perpendicular to the first axis; the through hole of the shaft extends in the second axis; the base unit further includes at least one antiskid bar mounted in the clamping wall of the positioning member and abutting the upright rod.

6. The musical instrument stand of claim 1, wherein the shaft of the base unit has an outer wall formed with a plurality of elongate keyways;

the support assembly further includes a pressing member mounted between the holding unit and the locking unit so that the holding unit is located between the pressing member and the support disk of the base unit;

the pressing member has a first side formed with a push disk located between the second cover of the holding unit and the locking nut of the locking unit and a second side formed with a mounting sleeve located between the second shaft hole of the second cover and the shaft of the base unit;

the mounting sleeve of the pressing member is inserted into the second shaft hole of the second cover;

the mounting sleeve of the pressing member has an inner wall formed with a mounting hole mounted on the shaft of the base unit;

the shaft of the base unit is inserted into the mounting hole of the mounting sleeve;

the mounting hole of the mounting sleeve has a periphery provided with a plurality of elongate splines inserted into and locked in the keyways of the shaft respectively.

* * * * *